(12) United States Patent
Tokunaga

(10) Patent No.: US 12,055,785 B2
(45) Date of Patent: Aug. 6, 2024

(54) IMAGE-CAPTURING APPARATUS AND METHOD FOR PRODUCING IMAGE-CAPTURING APPARATUS

(71) Applicant: SONY SEMICONDUCTOR SOLUTIONS CORPORATION, Kanagawa (JP)

(72) Inventor: Junichi Tokunaga, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 910 days.

(21) Appl. No.: 17/047,610

(22) PCT Filed: Feb. 5, 2019

(86) PCT No.: PCT/JP2019/003971
§ 371 (c)(1),
(2) Date: Oct. 14, 2020

(87) PCT Pub. No.: WO2019/207897
PCT Pub. Date: Oct. 31, 2019

(65) Prior Publication Data
US 2021/0149147 A1    May 20, 2021

(30) Foreign Application Priority Data
Apr. 27, 2018   (JP) .................. 2018-085966

(51) Int. Cl.
*G02B 7/02*   (2021.01)
*G02B 7/00*   (2021.01)

(52) U.S. Cl.
CPC ............ *G02B 7/025* (2013.01); *G02B 7/003* (2013.01); *G02B 7/021* (2013.01); *G02B 7/023* (2013.01)

(58) Field of Classification Search
CPC ........ G02B 7/021; G02B 7/023; G02B 7/025; G02B 7/003; G02B 7/08; G03B 17/02
See application file for complete search history.

(56) References Cited

U.S. PATENT DOCUMENTS

| 7,427,332 B2* | 9/2008 | Takemoto ............... C09J 5/00 156/275.7 |
| 7,493,004 B2* | 2/2009 | Tekippe ............... G02B 6/3582 385/18 |

(Continued)

FOREIGN PATENT DOCUMENTS

| CN | 101471359 A | 7/2009 |
| CN | 106664358 A | 5/2017 |

(Continued)

OTHER PUBLICATIONS

The American Heritage Desk Dictionary 234 (1981). (Year: 1981).*

(Continued)

*Primary Examiner* — Ephrem Z Mebrahtu
*Assistant Examiner* — Wesley Scott Ashton
(74) *Attorney, Agent, or Firm* — CHIP LAW GROUP

(57) ABSTRACT

To simplify mounting of a component near a shield cover in an image-capturing apparatus. An image-capturing apparatus includes an imaging device, a substrate, a drive circuit, a lens unit, an adhesive, and a shield cover. The imaging device is arranged on the substrate. The drive circuit is arranged on the substrate to be adjacent to the imaging device. The lens unit includes a lens and a frame-shaped rib, the lens forming an image of a subject into the imaging device, the rib being arranged in a bottom portion of the lens unit and surrounding the imaging device, the lens unit being arranged by the rib being placed on the substrate. The adhesive has a photo-curable property and bonds the lens (Continued)

unit to the substrate. The shield cover includes a light path used when the adhesive is cured and covers the drive circuit.

14 Claims, 9 Drawing Sheets

(56) References Cited

U.S. PATENT DOCUMENTS

| | | | | |
|---|---|---|---|---|
| 7,729,606 | B2* | 6/2010 | Webster | G02B 7/021 |
| | | | | 348/340 |
| 8,202,391 | B2* | 6/2012 | Egawa | G02B 7/025 |
| | | | | 156/273.5 |
| 8,599,263 | B2* | 12/2013 | Kojima | H01L 31/0203 |
| | | | | 348/164 |
| 9,456,508 | B2* | 9/2016 | Stanley | B29C 66/61 |
| 9,927,594 | B2* | 3/2018 | Yamamoto | G02B 27/646 |
| 10,915,009 | B2* | 2/2021 | Tokunaga | G03B 19/07 |
| 2012/0261066 | A1* | 10/2012 | Smith | B29C 65/1483 |
| | | | | 156/275.5 |
| 2017/0223243 | A1 | 8/2017 | Nakamura et al. | |
| 2019/0031930 | A1* | 1/2019 | Zolotykh | C09J 163/00 |

FOREIGN PATENT DOCUMENTS

| | | |
|---|---|---|
| JP | 2003-133777 A | 5/2003 |
| JP | 2003-324660 A | 11/2003 |
| JP | 2008-028838 A | 2/2008 |
| JP | 2009-164720 A | 7/2009 |
| WO | 2016/017682 A1 | 2/2016 |
| WO | WO-2017179445 A1 * 10/2017 ............. G03B 17/02 |

OTHER PUBLICATIONS

Yukinari Abe et al., Pre-curable Adhesive for Image Sensor Packages, IEEE Polytronic 2007 Conference 125-127 (2007). (Year: 2007).*
Machine English Translation of JP 2009-164720 A obtained from Patent Translate with JP 2009-164720A and Espacenet Bibliographic Data, 2023. (Year: 2023).*
Machine English Translation of JP 2008-028838 A obtained from Patent Translate with JP 2008-028838A and Espacenet Bibliographic Data, 2023. (Year: 2023).*
Machine English Translation of JP 2003-324660 A obtained from Patent Translate with JP 2003-324660A and Espacenet Bibliographic Data, 2023. (Year: 2023).*
Juergen Carstens, Controlled Gluing Connection Between Faceplates and Shell, 2009, pp. 1-2 [online], [retrieved Mar. 13, 2024], retrieved from the Internet <URL: https://ip.com/IPCOM/000184356>. (Year: 2009).*
International Search Report and Written Opinion of PCT Application No. PCT/JP2019/003971, issued on Apr. 23, 2019, 09 pages of ISRWO.

* cited by examiner

IMAGE-CAPTURING APPARATUS AND METHOD FOR PRODUCING IMAGE-CAPTURING APPARATUS

CROSS REFERENCE TO RELATED APPLICATIONS

This application is a U.S. National Phase of International Patent Application No. PCT/JP2019/003971 filed on Feb. 5, 2019, which claims priority benefit of Japanese Patent Application No. JP 2018-085966 filed in the Japan Patent Office on Apr. 27, 2018. Each of the above-referenced applications is hereby incorporated herein by reference in its entirety.

TECHNICAL FIELD

The present disclosure relates to an image-capturing apparatus and a method for producing the image-capturing apparatus. In particular, the present disclosure relates to an image-capturing apparatus including a shield cover and a method for producing the image-capturing apparatus.

BACKGROUND ART

Conventionally, an electronic apparatus including a shield cover is used to prevent an unnecessary radiation from an electronic circuit section of the electronic apparatus and to prevent a failure from occurring due to radiant noise from an external electronic apparatus. For example, an electronic apparatus is used in a PC card wireless terminal that performs wireless communication, the electronic apparatus including an electromagnetic shield that includes a shield frame and a shield cover, the shield frame being arranged to surround a high-frequency circuit section from among a circuit board on which electronic components are mounted, the shield cover covering the shield frame (for example, refer to Patent Literature 1). The shield frame and the shield cover are made of metal, and make it possible to prevent an unnecessary radiation and to prevent external radiant noise from entering. The shield frame includes a flange, and the shield cover is fixed by being locked into the flange. In this case, a dogleg bent portion formed on an edge of the shield cover is fit into a hole included in the flange to be locked.

CITATION LIST

Patent Literature

Patent Literature 1: Japanese Patent Application Laid-open No. 2003-133777

DISCLOSURE OF INVENTION

Technical Problem

In the related art described above, the shield frame that locks the shield cover is mounted on the circuit board by soldering. When the related art described above is applied to an image-capturing apparatus, reflow soldering is performed on the shield frame, and then a lens holding section including, for example, an actuator of a lens is arranged by being bonded using an adhesive. In order to make the image-capturing apparatus smaller, there is a need to increase the mounting density by arranging the lens holding section close to the shield frame. However, there is a problem in which a process of bonding, to the circuit board, the lens holding section situated close to the shield frame becomes complicated, since the shield frame is a relatively large member.

The present disclosure has been achieved in view of the problems described above, and it is an object of the present disclosure to simplify mounting of a component near a shield cover.

Solution to Problem

The present disclosure has been achieved to solve the problems described above, and a first aspect of the present disclosure is an image-capturing apparatus that includes an imaging device; a substrate on which the imaging device is arranged; a drive circuit that is arranged on the substrate to be adjacent to the imaging device; a lens unit that includes a lens and a frame-shaped rib, the lens forming an image of a subject into the imaging device, the rib being arranged in a bottom portion of the lens unit and surrounding the imaging device, the lens unit being arranged by the rib being placed on the substrate; an adhesive that has a photo-curable property and bonds the lens unit to the substrate; and a shield cover that includes a light path used when the adhesive is cured and covers the drive circuit.

Further, in the first aspect, the adhesive may be cured by light irradiated onto a corner portion of the bottom portion of the lens unit.

Further, in the first aspect, the shield cover may have a lid shape that includes a rectangular top plate and a side plate adjacent to an end of the top plate, and the light path may be arranged close to the corner portion of the bottom portion of the lens unit.

Further, in the first aspect, the shield cover may include, as the light path, a notch formed in a corner portion of the shield cover.

Further, in the first aspect, the notch may be formed in the side plate in the corner portion of the shield cover.

Further, in the first aspect, the notch may further be formed in the top plate in the corner portion of the shield cover.

Further, in the first aspect, the notch may have a shape having a wider width toward the substrate.

Further, in the first aspect, the adhesive may be cured by light irradiated onto four corners of the bottom portion of the lens unit.

Further, in the first aspect, a holding frame that has a frame shape surrounding the imaging device and is arranged on the substrate to hold the lens unit, may further be included, and the adhesive may bond the lens unit to the substrate by bonding the holding frame and the lens unit.

Further, in the first aspect, the holding frame may include an optical filter through which light of a specified wavelength from among light entering the imaging device, is transmitted.

Further, in the first aspect, a closing portion that closes the light path of the shield cover after the adhesive is cured, may further be included.

Further, in the first aspect, the adhesive may perform bonding of the lens unit after an optical-axis adjustment is performed, the optical-axis adjustment being an adjustment of an optical axis of the lens unit with respect to the imaging device.

Further, in the first aspect, after the optical-axis adjustment is performed, the adhesive may perform a provisional bonding that is bonding of a portion of the bottom portion of the lens unit, and may perform a complete bonding that is bonding of an entire periphery of a bottom portion of the rib.

Further, a second aspect of the present disclosure is a method for producing an image-capturing apparatus, the method including arranging a drive circuit on a substrate such that the drive circuit is adjacent to an imaging device arranged on the substrate; arranging a shield cover that includes a light path used when an adhesive is cured and covers the drive circuit, the adhesive having a photo-curable property and bonds a lens unit to the substrate, the lens unit including a lens and a frame-shaped rib, the lens forming an image of a subject into the imaging device, the rib being arranged in a bottom portion of the lens unit and surrounding the imaging device; arranging the imaging device on the substrate; arranging the lens unit by the rib included in the lens unit being placed on the substrate on which the imaging device is arranged; and bonding the lens unit to the substrate by irradiating light onto the adhesive through the light path and by curing the adhesive.

Due to such aspects, the adhesive arranged between the bottom portion of the lens unit and the substrate is irradiated with light through the light path arranged in the shield cover. This also makes it possible to cure the adhesive when the shield cover is arranged near the lens unit, and the method for producing an image-capturing apparatus in which components are mounted at a high density is expected to be simplified.

Advantageous Effects of Invention

The present disclosure provides an excellent effect of simplifying mounting of a component near a shield cover.

MODE(S) FOR CARRYING OUT THE INVENTION

Next, modes for carrying out the present disclosure (hereinafter referred to as embodiments) will be described with reference to the drawings. In the accompanying drawings, the same or similar portions will be denoted by the same or similar reference symbols. However, the figures are schematic ones, and, for example, a ratio of dimensions of respective components is not necessarily the same as the actual one. Further, of course, a certain figure and another figure have different dimensional relationships or different ratios of dimensions with respect to the same portion. Moreover, the embodiments will be described in the following order.

1. First Embodiment
2. Second Embodiment

1. First Embodiment

[Appearance of Image-Capturing Apparatus]

Figure 1A:
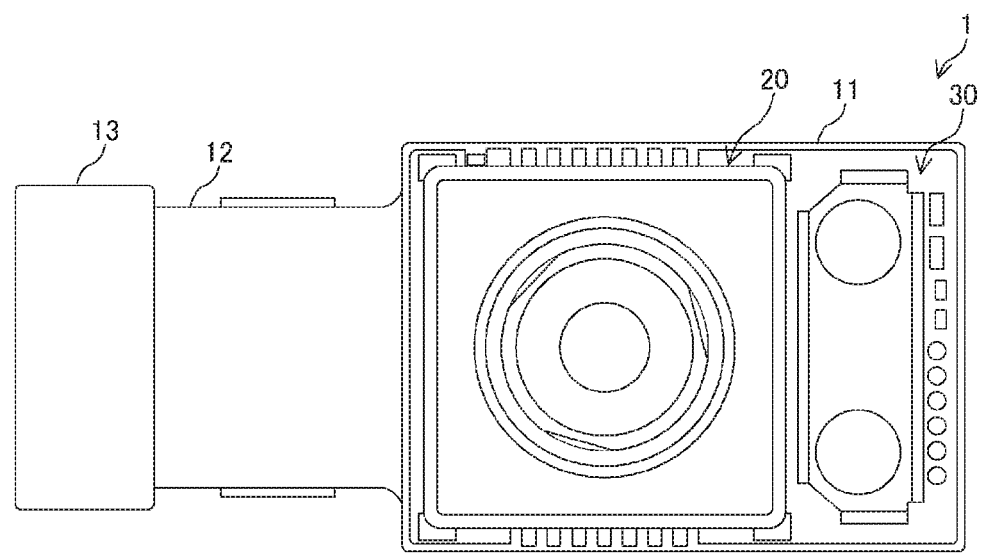
FIGS. 1A and 1B illustrate an appearance of an example of an image-capturing apparatus according to a first embodiment of the present disclosure.
Figure 1B:
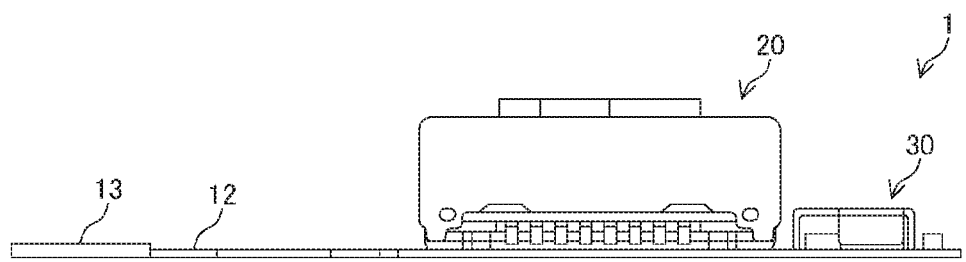

FIGS. 1A and 1B illustrate an appearance of an example of an image-capturing apparatus according to a first embodiment of the present disclosure. FIG. 1A is a top view of an image-capturing apparatus 1, and FIG. 1B is a side view of the image-capturing apparatus 1. The image-capturing apparatus 1 in the figure includes a lens unit 20 and a drive circuit section 30 that are arranged on a substrate 11. The lens unit 20 forms an image of a subject on an imaging device 14 (not illustrated). As described later, the lens unit 20 is fixed to the substrate 11 through a holding frame 15, and forms an image of the subject on the imaging device 14 through an optical filter 17. The drive circuit section 30 is an electronic circuit that drives the lens unit 20 and the imaging device 14. The substrate 11 is a substrate on which the lens unit 20 and the imaging device 14 are mounted. A flexible circuit board 12 is connected to the substrate 11, and a connector 13 is connected to an end of the flexible circuit board 12. A signal of, for example, the imaging device 14 is transmitted to an apparatus such as a camera through the flexible circuit board 12 and the connector 13. Thus, the image-capturing apparatus 1 in the figure corresponds to an imaging device module in which the imaging device 14 and the lens unit 20 are integrated.

Figure 2:
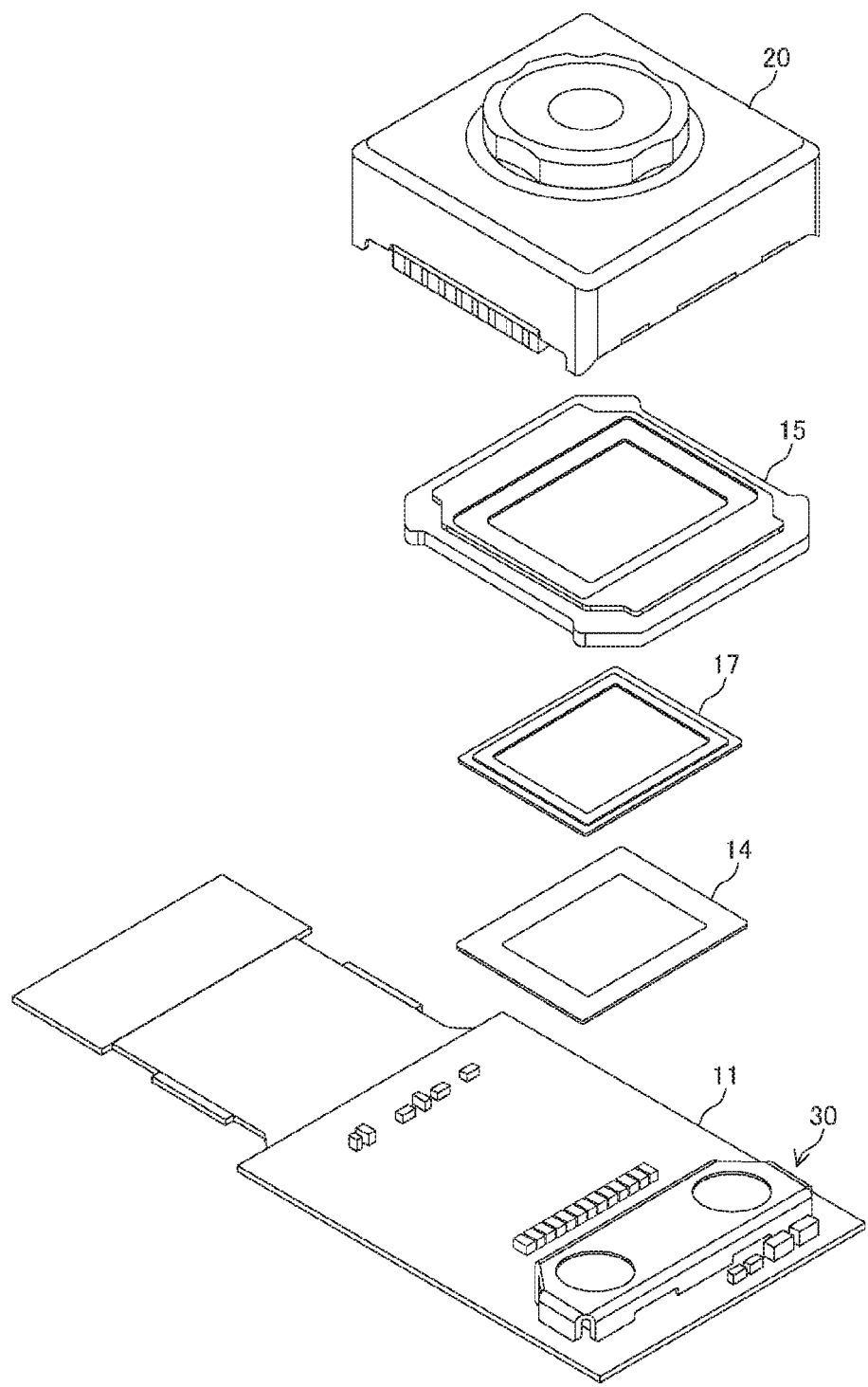
FIG. 2 is an exploded view of the example of the image-capturing apparatus separated into components according to the first embodiment of the present disclosure.

FIG. 2 is an exploded view of the example of the image-capturing apparatus separated into components according to the first embodiment of the present disclosure. As illustrated in the figure, the image-capturing apparatus 1 is formed by arranging the imaging device 14, the optical filter 17, the holding frame 15, and the lens unit 20 in this order on the substrate 11 on which the drive circuit section 30 is mounted.

[Configuration of Image-Capturing Apparatus]

Figure 3:
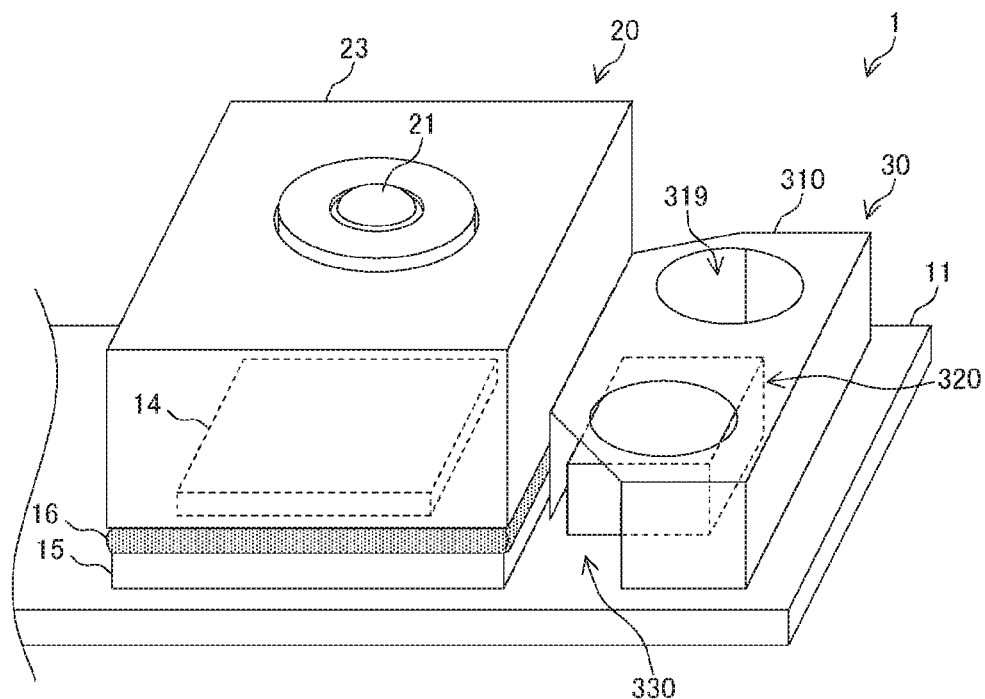
FIG. 3 illustrates a configuration example of the image-capturing apparatus according to the first embodiment of the present disclosure.

FIG. 3 illustrates a configuration example of the image-capturing apparatus according to the first embodiment of the present disclosure. The figure schematically illustrates the image-capturing apparatus 1 described in FIGS. 1A and 1B. The image-capturing apparatus 1 in the figure includes the substrate 11, the holding frame 15, an adhesive 16, the imaging device 14, the lens unit 20, and the drive circuit section 30.

The substrate 11 is a substrate on which the imaging device 14, the lens unit 20, and the drive circuit section 30 are mounted. Wiring used to transmit a signal to, for example, the imaging device 14 is formed on the substrate 11. A pad is arranged at an end of the wiring, and the substrate 11 is electrically connected to the imaging device 14 through the pad.

The imaging device 14 is a semiconductor device that images a subject. The imaging device 14 converts, into an image signal, light from the subject that is collected by the lens unit 20 described later, and outputs the image signal. The imaging device 14 is provided as a semiconductor chip, and is mounted on the substrate 11 in the form of a bare chip. For example, the imaging device 14 is bonded to the substrate 11 using a die bonding material, and it is possible to connect a pad formed on the imaging device 14 to the pad of the substrate 11 by wire bonding.

The lens unit 20 collects light from a subject into the imaging device 14. The lens unit 20 includes a plurality of lenses, and forms an image of the subject on a light receiving surface of the imaging device 14. A lens 21 in the figure is an outermost lens from among lenses included in the lens unit 20. As described later, the lens unit 20 includes an actuator 22 that changes the position of an optical-axis direction of a lens. The actuator 22 makes it possible to adjust the position of a lens to focus incident light onto the light receiving surface of the imaging device 14. Further, the lens unit 20 is arranged to cover the surface of the imaging device 14, and protects the imaging device 14. As described later, a frame-shaped rib 24 surrounding the imaging device 14 is formed in a bottom portion of the lens unit 20, and the lens unit 20 is bonded to the substrate 11 in a bottom portion of the rib 24. This results in the imaging device 14 being sealed and protected. Note that a housing 23 illustrated in the figure is a housing that surrounds the actuator 22 and the lens 21. The housing 23 may be made of metal. In this case, it is possible to reduce an unnecessary radiation from the actuator 22 by connecting the housing 23 to a ground point of the substrate 11 (not illustrated).

An optical axis of the lens unit 20 is adjusted before the lens unit 20 is fixed to the image-capturing apparatus 1. It is possible to adjust the optical axis by performing a 6-axis adjustment of the lens unit 20 with respect to the imaging device 14. Here, the six-axis adjustment includes performing adjustments with respect to three axes that are axes (x, y) perpendicular to the optical axis and an axis (z) parallel to the optical axis, and performing adjustments of rotation angles respectively formed by rotating about these three axes. It is possible to perform these adjustments by changing a position and an angle for mounting the lens unit 20 itself. It is also possible to perform these adjustments by changing a position and an angle of a lens barrel from among the lens unit 20 that holds the lens 21 and the like.

The holding frame 15 holds the lens unit 20. The holding frame 15 is arranged on the substrate 11, and holds the lens unit 20 by the lens unit 20 being bonded to the holding frame 15 using the adhesive 16 described later. An opening having a shape that surrounds the imaging device 14 is formed in the holding frame 15, and light collected by the lens unit 20 enters the imaging device 14 through the opening. The optical filter 17 may also be arranged in the opening. The optical filter 17 is an optical filter through which light of a specified wavelength is transmitted. For example, an optical filter that blocks infrared light and through which visible light is transmitted, may be used as the optical filter 17. Further, a rib 19 is arranged on an upper surface, of the holding frame 15, that is situated outside of the opening. Note that the configuration of the holding frame 15 will be described later in detail.

The adhesive 16 bonds the lens unit 20 to the substrate 11. The adhesive 16 in the figure bonds the lens unit 20 to the holding frame 15 to bond the lens unit 20 to the substrate 11. For example, an adhesive having a photo-curable property may be used as the adhesive 16. Further, for example, it is also possible to provisionally cure the adhesive 16 (perform a provisional bonding) utilizing a photo-curable property, and to completely cure the adhesive 16 (perform a complete bonding) utilizing a thermosetting property, using, as the adhesive 16 in the figure, an adhesive having the photo-curable property and the thermosetting property. It is also possible to perform a provisional bonding after the above-described adjustment of the optical axis of the lens unit 20 is performed, and to collectively perform a complete bonding by simultaneously heating a plurality of image-capturing apparatuses 1 each including the provisionally bonded lens unit 20. The complete bonding makes it possible to improve the bonding strength of the adhesive 16, and to achieve high reliability. It is possible to perform a complete bonding by, for example, performing heating in a constant temperature oven or the like. It is possible to simplify the production process by collectively performing a complete bonding on a plurality of image-capturing apparatuses 1 on which an adjustment of an optical axis and a provisional bonding have been performed.

The drive circuit section 30 drives the imaging device 14 and the lens unit 20. The drive circuit section 30 includes a drive circuit 320 and a shield cover 310. The drive circuit 320 is an electronic circuit that drives the imaging device 14 and the actuator 22. The drive circuit 320 includes the wiring formed on the substrate 11 and the components mounted on the substrate 11. A rectangular parallelepiped in the figure represents an electronic component such as an IC included in the drive circuit 320.

The shield cover 310 forms an electromagnetic shield of the drive circuit 320. The shield cover 310 has a lid shape that covers the drive circuit 320, and reduces an unnecessary radiation from the drive circuit 320 to prevent the electromagnetic interference (EMI). Further, the shield cover 310 blocks radiant noise from the outside to improve the electromagnetic compatibility (EMC) in the drive circuit 320. The shield cover 310 may be made of, for example, metal such as stainless steel. Note that a hole 319 formed on an upper surface of the shield cover 310 in the figure is a hole used to visually confirm the drive circuit 320. The figure illustrates an example of the shield cover 310 in which two holes 319 are formed. It is also possible to omit the hole 319.

A light path 330 is formed in the shield cover 310. The light path 330 is a light path used to irradiate light when the adhesive 16 is cured. The light path 330 in the figure is formed of a notch formed in a corner portion of the shield cover 310 that is adjacent to a corner portion of the bottom portion of the lens unit 20. The configuration of the light path 330 will be described later in detail.

[Configuration of Cross Section of Image-Capturing Apparatus]

Figure 4:
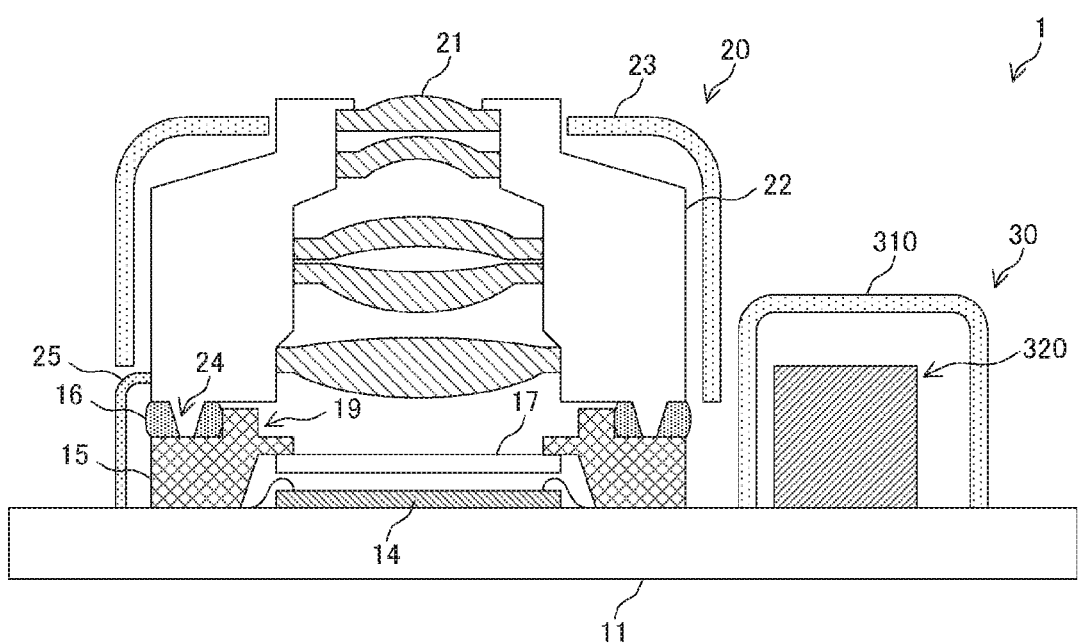
FIG. 4 is a cross-sectional view illustrating the configuration example of the image-capturing apparatus according to the first embodiment of the present disclosure.

FIG. 4 is a cross-sectional view illustrating the configuration example of the image-capturing apparatus according to the first embodiment of the present disclosure. The figure schematically illustrates a configuration of a cross section of the image-capturing apparatus 1.

The lens unit 20 in the figure is formed by arranging the actuator 22 and a plurality of lenses 21 in the housing 23. For convenience, the actuator 22 is also illustrated as a constituent member such as the lens barrel of the lens 21. The figure illustrates an example in which five lenses 21 are arranged. It is possible to adjust the focus by moving some of the lenses 21 in the optical-axis direction (an up-down direction in the figure). The rib 24 is arranged in a bottom portion of the actuator 22. Further, a terminal 25 is arranged in the lens unit 20 in the figure. The terminal 25 is a terminal used to transmit, for example, a control signal used to drive the actuator 22, and is connected to the pad formed on the substrate 11, using soldering.

The imaging device 14 is connected to the substrate 11 by wire bonding. The holding frame 15 is arranged to surround the imaging device 14.

The holding frame 15 is bonded to the substrate 11, and the optical filter 17 is arranged in the opening of the holding frame 15, the opening being formed above the imaging device 14. Further, the rib 19 is arranged to surround the opening, the adhesive 16 is applied to a difference in level between an outer edge of the rib 19 and an outer edge of the holding frame 15, and the rib 24 of the actuator 22 is placed on the difference in level. After the position and the tilt of the lens unit 20 including the actuator 22 are adjusted in order to adjust the optical axis, the actuator 22 and the holding frame 15 are provisionally bonded to each other using the adhesive 16. The rib 24 situated on the side of the actuator 22 and the rib 19 situated on the side of the holding frame 15 make it possible to prevent leakage of outside light from a joint portion. Further, the application of the adhesive 16 to the outside of the rib 19 makes it possible to prevent the surface of the optical filter 17 from being contaminated by the adhesive 16.

The drive circuit section 30 is arranged close to the lens unit 20. The shield cover 310 and electronic components of the drive circuit 320 that form the drive circuit section 30 are mounted on the substrate 11. Specifically, they are collectively mounted on the substrate 11 by reflow soldering. This makes it possible to simplify mounting of the drive circuit section 30. Note that the shield cover 310 is connected to the ground point of the substrate 11, and serves as an electromagnetic shield.

[Curing of Adhesive]

Figure 5:
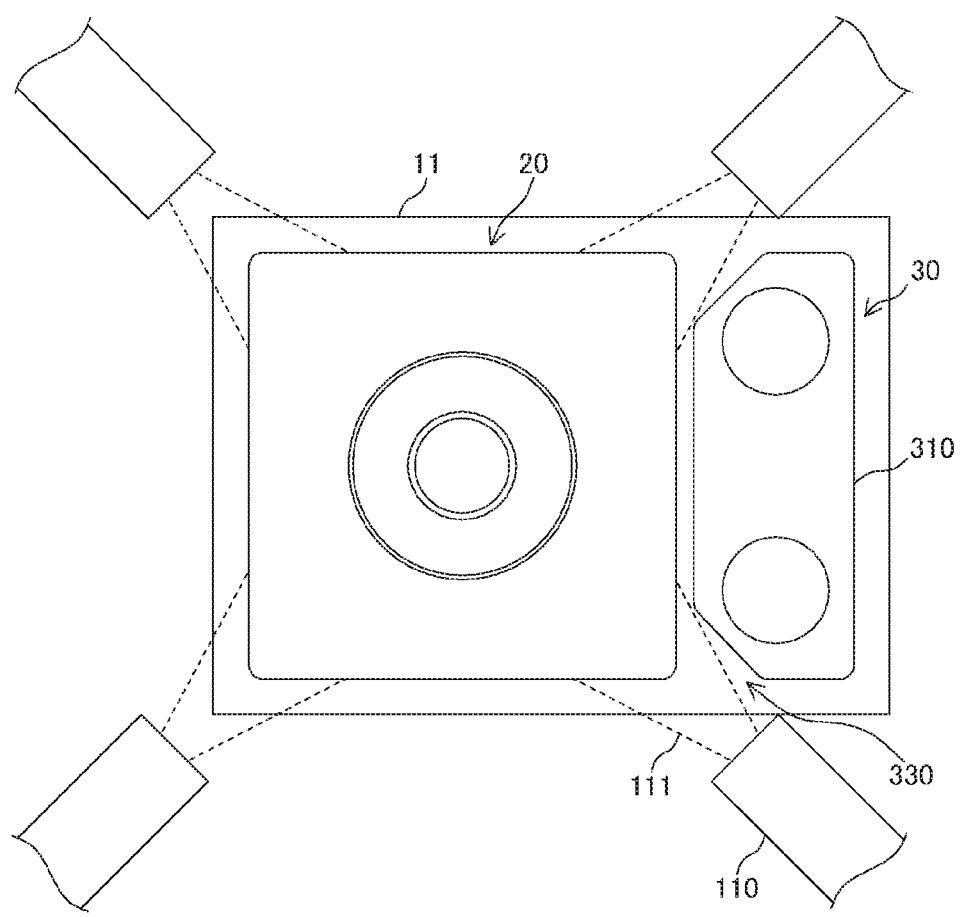
FIG. 5 illustrates an example of curing an adhesive according to the first embodiment of the present disclosure.

FIG. 5 illustrates an example of curing an adhesive according to the first embodiment of the present disclosure. The figure illustrates how to bond the lens unit 20 to the substrate 11. Bonding of the lens unit 20 using the adhesive 16 is described using the figure as an example. As described above, a provisional bonding is performed after the optical axis is adjusted. It is possible to perform the provisional bonding by irradiating light (ultraviolet rays). The figure illustrates an example of performing a provisional bonding by irradiating ultraviolet rays onto a corner portion of the lens unit 20 using an optical fiber 110. Dotted lines in the figure indicate ultraviolet rays 111 emitted from the optical fiber 110. It is possible to cure the adhesive 16 described with reference to FIG. 3 by irradiating the ultraviolet rays 111 onto the four corners of the lens unit 20 at the same time, using four optical fibers 110. In the figure, the ultraviolet rays 111 are irradiated in a direction extending from the corner portion of the lens unit 20 to the center of the lens unit 20. This can be achieved by arranging the optical fiber 110 at a position that forms an angle of 45 degrees with a side of the lens unit 20. The simultaneous bonding of the four corners of the bottom portion of the lens unit 20 makes it possible to reduce the time necessary to perform a provisional bonding while securing the bonding strength.

From among the four corners, the corner portion close to the drive circuit section 30 is situated behind the shield cover 310, and thus irradiation of the ultraviolet rays 111 is prevented. This results in an insufficient amount of the ultraviolet rays 111 and in a longer time necessary to cure the adhesive 16. Thus, the light path 330 is arranged in the shield cover 310. This results in irradiating a sufficient amount of the ultraviolet rays 111 onto the lens unit 20, and thus in being able to reduce the time necessary to cure the adhesive 16. It becomes possible to adopt a commonly used photo-curable resin as the adhesive 16. Further, since it is possible to arrange the drive circuit section 30 close to the lens unit 20, it is possible to improve the mounting density of the image-capturing apparatus 1. Furthermore, since it is possible to mount the shield cover 310 at the same time as the drive circuit 320, it is possible to simplify the process of producing the drive circuit section 30.

Note that the configuration of the image-capturing apparatus 1 is not limited to this example. For example, a production method including bonding a portion other than the four corners may also be adopted.

[Configuration of Shield Cover]

Figure 6A:
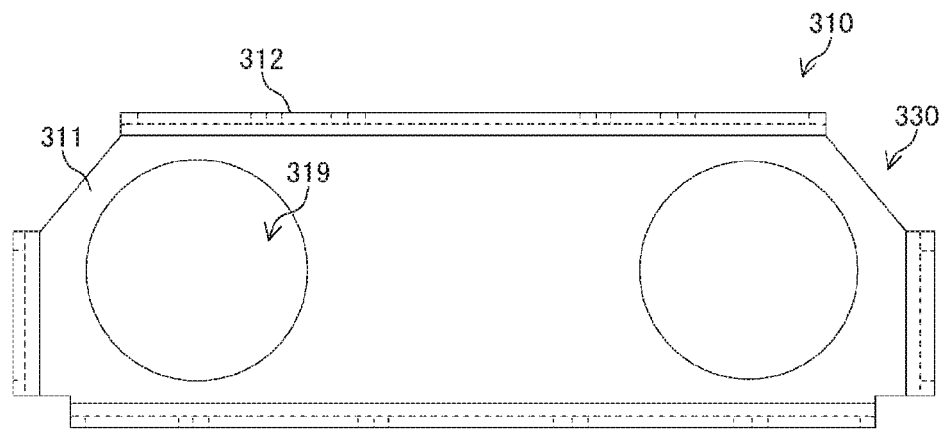
FIGS. 6A, 6B, 6C, and 6D illustrate a configuration example of a shield cover according to the first embodiment of the present disclosure.
Figure 6B:
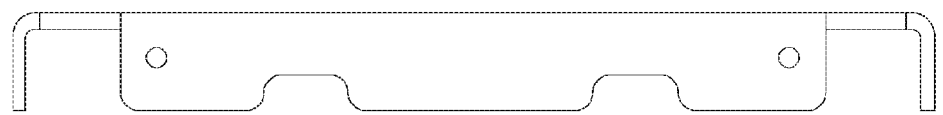
Figure 6C:
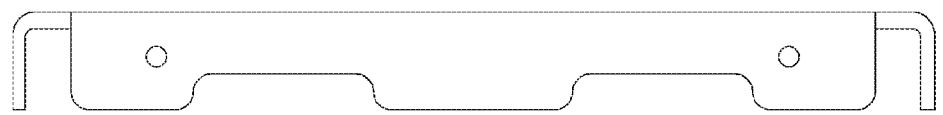
Figure 6D:
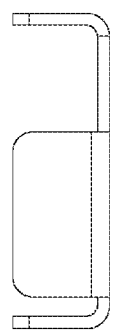

FIGS. 6A, 6B, 6C, and 6D illustrate a configuration example of a shield cover according to the first embodiment of the present disclosure. The figures illustrate a configuration example of the shield cover 310. FIG. 6A is a plan view of the shield cover 310. FIG. 6B is a side view of the shield cover 310 as viewed from a side surface on the side of a long side of the shield cover 310, the side of the long side of the shield cover 310 being a side on which the light path 330 is arranged. FIG. 6C is a side view of the shield cover 310 as viewed from a side surface on the side of a long side of the shield cover 310, the side of the long side of the shield cover 310 being a side on which the light path 330 is not arranged. FIG. 6D is a side view of the shield cover 310 as viewed from a side surface on the side of a short side of the shield cover 310.

The shield cover 310 in the figure is formed of a top plate 311 and a side plate 312 that is adjacent to an end of the top plate 311. As described above, the hole 319 is arranged in the top plate 311. A bottom portion of the side plate 312 is connected to the pad of the substrate 11 using soldering. It is possible to arrange, in the shield cover 310, the light path 330 having a shape in conformity to the direction of emitting the ultraviolet rays 111 described with reference to FIG. 5. For example, it is possible to arrange, as the light path 330, a notch having a shape obtained by obliquely cutting the corner portion of the shield cover 310 at an angle of 45 degrees. It is possible to form such a shield cover 310 using, for example, press bending, drawing, or die casting.

[Configuration of Light Path]

Figure 7A:
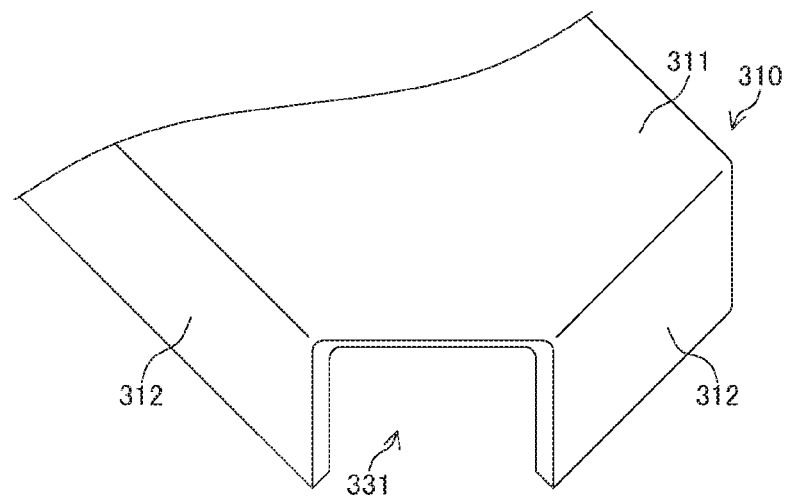
FIGS. 7A, 7B, and 7C illustrate a configuration example of a light path according to the first embodiment of the present disclosure.
Figure 7B:
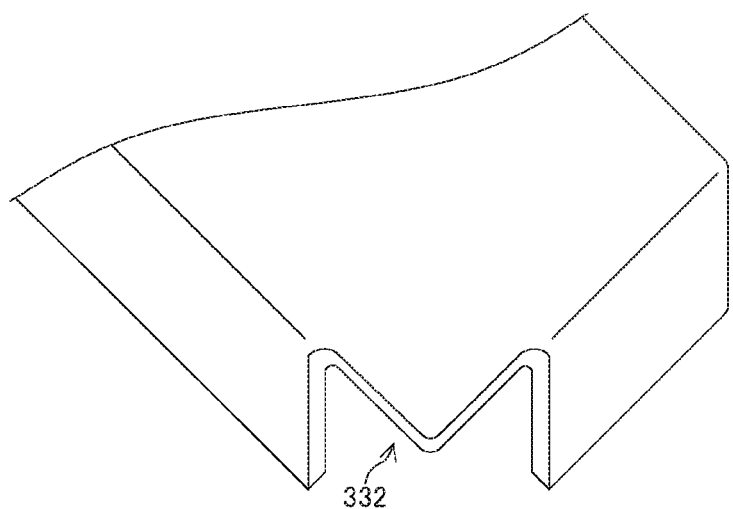
Figure 7C:
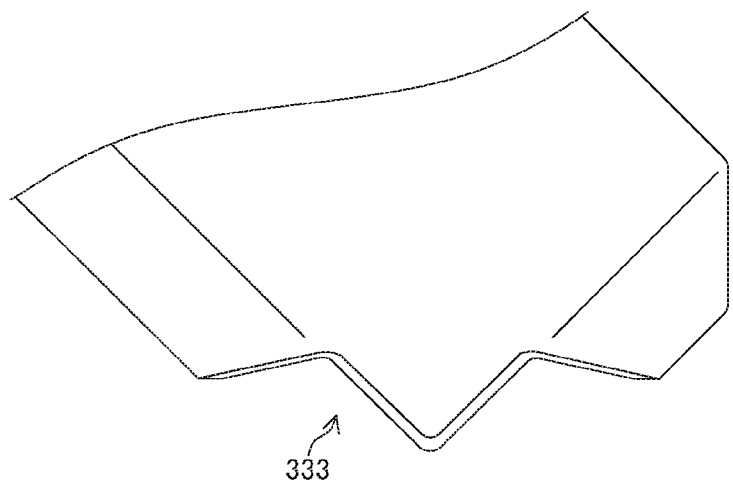

FIGS. 7A, 7B, and 7C illustrate a configuration example of a light path according to the first embodiment of the present disclosure. The figure illustrates an example of using a notch as the light path 330.

FIG. 7A illustrates an example of a notch 331 formed by cutting the top plate 311 and the side plate 312 of the corner portion of the shield cover 310. The notch 331 has a shape obtained by obliquely cutting the top plate 311 of the corner portion of the shield cover 310 at an angle of about 45 degrees with respect to the end of the top plate 311. In this case, the shape is obtained by removing a portion of the side plate 312 that coincides with a cut plane of the top plate 311. The shape of the surface of a notch is relatively simple, and is easy to process.

FIG. 7B illustrates an example of a notch 332 obtained by cutting the side plate 312 of the corner portion of the shield cover 310 and leaving the top plate 311. Since the notch 332 has a shape that includes the top plate 311 protruding in the corner portion of the shield cover 310, it is possible to improve the effect of an electromagnetic shield.

FIG. 7C illustrates an example of a notch 333 obtained by obliquely cutting the side plate 312 of the corner portion. As illustrated in c of the figure, a notch that has a shape having a wider width toward the substrate 11 on which the side plate 312 is mounted, is formed in the side plate 312. This results in being able to increase the projection area of the light path 330, and thus to increase an amount of the ultraviolet rays 111 irradiated onto the lens unit 20.

It is possible to form the light path 330 using the notches 331 to 333. Further, the arrangement of the notch 331 makes it possible to easily discharge a solvent when the drive circuit section 30 is cleaned. As described above, the shield cover 310 and the electronic components of the drive circuit 320 are mounted on the substrate 11 by reflow soldering. After performing soldering, flux and the like are washed away by, for example, immersing, in a solvent or the like, the shield cover 310 and the electronic components of the drive circuit 320 together with the substrate 11. When the solvent or the like is dried after the flux and the like are washed away, the notch 331 or the like makes it possible to easily discharge the solvent or the like staying in the shield cover 310. This results in being able to reduce the time necessary to perform cleaning.

[Method for Producing Image-Capturing Apparatus]

Figure 8:
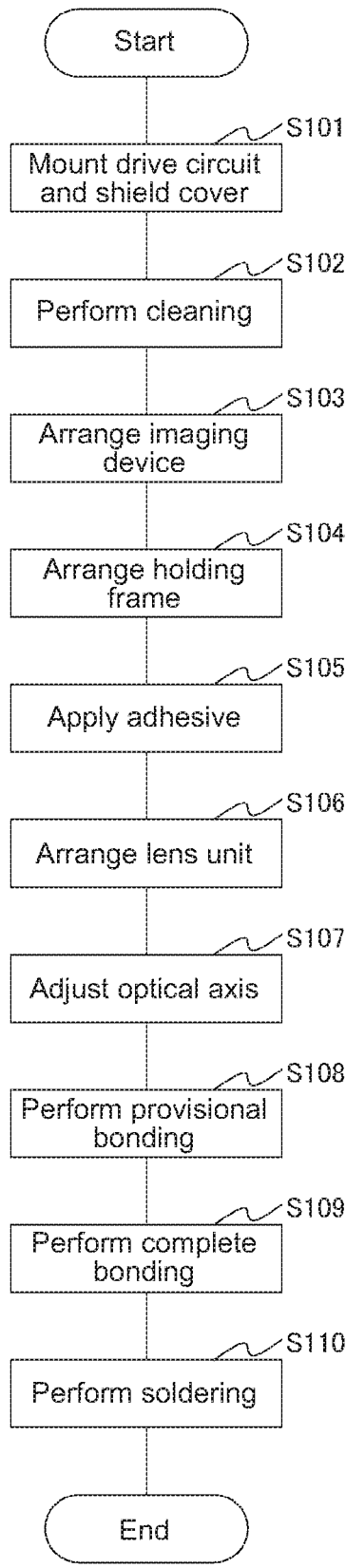

FIG. 8 illustrates an example of a method for producing an image-capturing apparatus according to the first embodiment of the present disclosure. The figure illustrates a process of producing the image-capturing apparatus 1. First, the electronic components of the drive circuit 320 and the shield cover 310 are mounted on the substrate 11. This can be achieved by reflow soldering (Step S101). This process is an example of arranging a drive circuit and arranging a shield cover according to an embodiment of the present disclosure.

Next, the substrate 11 on which the shield cover 310 and the like are mounted is cleaned (Step S102). Next, the imaging device 14 is arranged on the substrate 11 (Step S103). This can be achieved by bonding the imaging device 14 to the substrate 11 (die bonding) and by connecting the imaging device 14 to the substrate 11 by wire bonding. This process is an example of arranging an imaging device according to an embodiment of the present disclosure.

Next, the holding frame 15 is arranged on the substrate 11 (Step S104). This can be achieved by bonding, to the substrate 11, the holding frame 15 in which the optical filter 17 is arranged. Next, the adhesive 16 is applied to the holding frame 15 (Step S105). At this point, the adhesive 16 is applied to a difference in level formed by the rib 19 of the holding frame 15. Next, the lens unit 20 is arranged on the holding frame 15 (Step S106). At this point, the lens unit 20 is arranged such that the rib 24 of the lens unit 20 is placed on the difference in level of the holding frame 15. This process is an example of arranging a lens unit according to an embodiment of the present disclosure.

Next, the optical axis of the lens unit 20 is adjusted (Step S107). Next, the ultraviolet rays 111 are irradiated onto the adhesive 16 to provisionally bond the lens unit 20 (Step S108). At this point, for example, the ultraviolet rays 111 are irradiated onto the four corners of the bottom portion of the lens unit 20. A region of the lens unit 20 that is adjacent to the shield cover 310 is irradiated with the ultraviolet rays 111 through the light path 330. This process is an example of curing an adhesive according to an embodiment of the present disclosure.

Next, a complete bonding is performed with respect to the substrate 11 to which the lens unit 20 has been provisionally bonded (Step S109). This can be achieved by, for example, heating, to a temperature of 90° C., the substrate 11 to which the lens unit 20 has been provisionally bonded. Next, the terminal 25 of the lens unit 20 is soldered to the substrate 11 (Step S110). When the soldering is performed, a terminal formed in the housing 23 of the lens unit 20 may be connected to the ground point of the substrate 11. Thereafter, a product inspection and the like are performed. The processes described above make it possible to produce the image-capturing apparatus 1.

As described above, in the image-capturing apparatus 1 of the first embodiment of the present disclosure, the adhesive 16 is cured by irradiating the ultraviolet rays 111 onto the adhesive 16 through the light path 330 of the shield cover 310, and the lens unit 20 is bonded to the substrate 11. This makes it possible to increase an amount of the ultraviolet rays 111 even when the shield cover 310 is situated close to the lens unit 20, and thus to easily cure the adhesive 16. It is possible to simplify the process of producing the image-capturing apparatus 1 in which the lens unit 20 and the drive circuit section 30 are mounted at a high density.

2. Second Embodiment

The image-capturing apparatus 1 of the first embodiment described above uses the shield cover 310 including the light path 330. On the other hand, the image-capturing apparatus 1 of a second embodiment of the present disclosure is different from the first embodiment described above in closing the light path 330 of the shield cover 310 after the adhesive 16 is cured.

[Configuration of Image-Capturing Apparatus]

Figure 9:
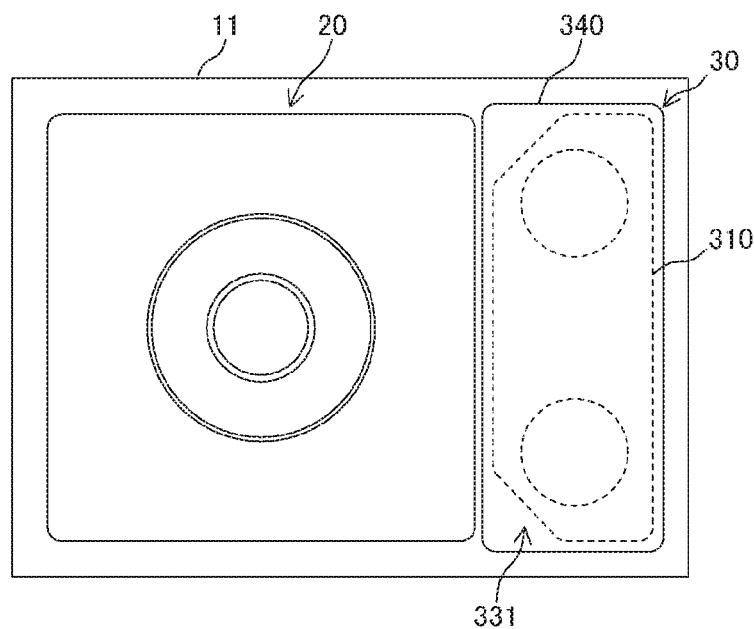

FIG. 9 illustrates an example of an image-capturing apparatus according to the second embodiment of the present disclosure. The image-capturing apparatus 1 in the figure is different from the image-capturing apparatus 1 described with reference to FIG. 3 in further including a closing portion 340.

The closing portion 340 closes the light path 330 of the shield cover 310. The closing portion 340 is made of a conductive member such as metal, and is connected to the shield cover 310. This makes it possible to reduce leakage of an electromagnetic wave from the light path 330. The closing portion 340 in the figure further closes the hole 319 of the shield cover 310. For example, the closing portion 340 may have a lid shape that covers the shield cover 310. Further, for example, the closing portion 340 may be attached to the shield cover 310 after a complete bonding is performed with respect to the adhesive 16.

[Configuration of Closing Portion]

Figure 10:
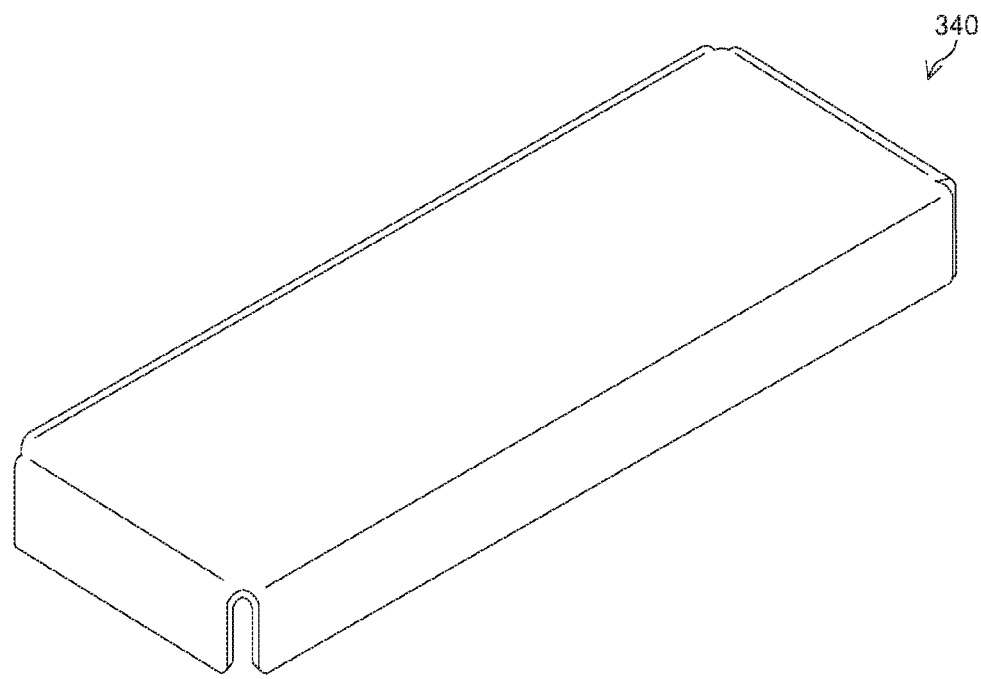

FIG. 10 illustrates a configuration example of a closing portion according to the second embodiment of the present disclosure. As illustrated in the figure, the closing portion 340 has a lid shape. Further, the closing portion 340 has a shape larger than that of the shield cover 310, and is capable of closing the shield cover 310 by the shield cover 310 being covered with the closing portion 340. In order to fix the closing portion 340 and to reduce an electrical resistance between the closing portion 340 and the shield cover 310, a convex portion may be formed in, for example, a side plate of the closing portion 340, and the convex portion may be brought into contact with the side plate 312 of the shield cover 310. In this case, a hole into which the convex portion of the closing portion 340 is fit, may be arranged in the side plate 312 of the shield cover 310. Note that the closing portion 340 in the figure has a shape including a gap in its corner portion, the gap being formed by bending. It is possible to achieve a higher shielding effect by making the gap smaller.

[Another Configuration of Image-Capturing Apparatus]

Figure 11:
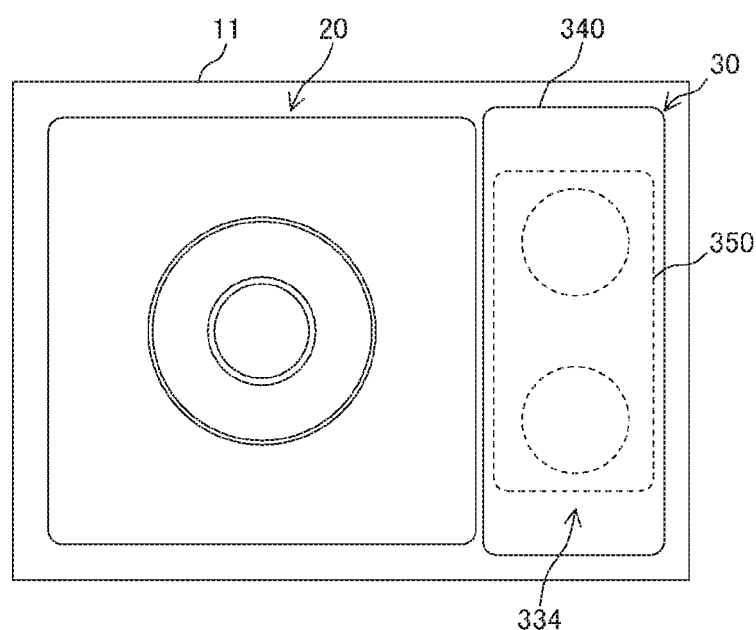

FIG. 11 illustrates another configuration example of the image-capturing apparatus according to the second embodiment of the present disclosure. The image-capturing apparatus 1 in the figure is different from the image-capturing apparatus 1 described with reference to FIG. 9 in including a shield cover 350 instead of the shield cover 310. The shield cover 350 in the figure includes a notch 334 as a light path. The notch 334 is formed by cutting an end on the side of a short side of the shield cover 350. Thus, the shield cover 350 has a U-shaped cross section. Compared to the case of the notch 331, it is possible to simplify the shape of the notch 334 while maintaining a substantially equal projection area of a light path. Even when the notch 334 having such a shape is adopted, the arrangement of the closing portion 340 makes it possible to reduce leakage of an electromagnetic wave from the shield cover 350.

Except for the points described above, the imaging device 1 has a configuration similar to the configuration of the imaging device 1 described in the first embodiment of the present disclosure. Thus, the description is omitted.

As described above, in the image-capturing apparatus 1 according to the second embodiment of the present disclosure, the arrangement of the closing portion 340 makes it possible to reduce leakage of an electromagnetic wave from a notch of the shield cover 310.

Finally, the descriptions of the respective embodiments above are examples of the present disclosure, and the present disclosure is not limited to the embodiments described above. Thus, various modifications may of course be made depending on the design and the like without departing from the technical idea according to the present disclosure even in the case of an embodiment other than the embodiments described above.

Note that the present technology may also take the following configurations.

(1) An image-capturing apparatus, including:
   an imaging device;
   a substrate on which the imaging device is arranged;
   a drive circuit that is arranged on the substrate to be adjacent to the imaging device;
   a lens unit that includes a lens and a frame-shaped rib, the lens forming an image of a subject into the imaging device, the rib being arranged in a bottom portion of the lens unit and surrounding the imaging device, the lens unit being arranged by the rib being placed on the substrate;
   an adhesive that has a photo-curable property and bonds the lens unit to the substrate; and
   a shield cover that includes a light path used when the adhesive is cured and covers the drive circuit.

(2) The image-capturing apparatus according to (1), in which
   the adhesive is cured by light irradiated onto a corner portion of the bottom portion of the lens unit.

(3) The image-capturing apparatus according to (2), in which
   the shield cover has a lid shape that includes a rectangular top plate and a side plate adjacent to an end of the top plate, and
   the light path is arranged close to the corner portion of the bottom portion of the lens unit.

(4) The image-capturing apparatus according to (3), in which
   the shield cover includes, as the light path, a notch formed in a corner portion of the shield cover.

(5) The image-capturing apparatus according to (4), in which
   the notch is formed in the side plate in the corner portion of the shield cover.

(6) The image-capturing apparatus according to (5), in which
   the notch is further formed in the top plate in the corner portion of the shield cover.

(7) The image-capturing apparatus according to (5), in which
   the notch has a shape having a wider width toward the substrate.

(8) The image-capturing apparatus according to any one of (2) to (7), in which
   the adhesive is cured by light irradiated onto four corners of the bottom portion of the lens unit.

(9) The image-capturing apparatus according to any one of (1) to (8), further including
   a holding frame that has a frame shape surrounding the imaging device and is arranged on the substrate to hold the lens unit, in which
   the adhesive bonds the lens unit to the substrate by bonding the holding frame and the lens unit.

(10) The image-capturing apparatus according to (9), in which
   the holding frame includes an optical filter through which light of a specified wavelength from among light entering the imaging device, is transmitted.

(11) The image-capturing apparatus according to any one of (1) to (10), further including
   a closing portion that closes the light path of the shield cover after the adhesive is cured.

(12) The image-capturing apparatus according to any one of (1) to (11), in which
   the adhesive performs bonding of the lens unit after an optical-axis adjustment is performed, the optical-axis adjustment being an adjustment of an optical axis of the lens unit with respect to the imaging device.

(13) The image-capturing apparatus according to (12), in which
   after the optical-axis adjustment is performed, the adhesive performs a provisional bonding that is bonding of a portion of the bottom portion of the lens unit, and performs a complete bonding that is bonding of an entire periphery of a bottom portion of the rib.

(14) A method for producing an image-capturing apparatus, the method including:
   arranging a drive circuit on a substrate such that the drive circuit is adjacent to an imaging device arranged on the substrate;
   arranging a shield cover that includes a light path used when an adhesive is cured and covers the drive circuit, the adhesive having a photo-curable property and bonds a lens unit to the substrate, the lens unit including a lens and a frame-shaped rib, the lens forming an image of a subject into the imaging device, the rib being arranged in a bottom portion of the lens unit and surrounding the imaging device;
   arranging the imaging device on the substrate;
   arranging the lens unit by the rib included in the lens unit being placed on the substrate on which the imaging device is arranged; and
   bonding the lens unit to the substrate by irradiating light onto the adhesive through the light path and by curing the adhesive.

REFERENCE SIGNS LIST 1 image-capturing apparatus
11 substrate
14 imaging device
15 holding frame
16 adhesive
17 optical filter
19, 24 rib
20 lens unit
22 actuator
23 housing
30 drive circuit section
310, 350 shield cover
311 top plate 312 side plate
320 drive circuit
330 light path
331 to 334 notch
340 closing portion

The invention claimed is:

1. An image-capturing apparatus, comprising:
an imaging device;
a substrate on which the imaging device is arranged;
a drive circuit on the substrate, wherein the drive circuit is to adjacent to the imaging device;
a lens unit that includes a lens and a frame-shaped rib, wherein
the lens is configured to form an image of a subject into the imaging device,
the frame-shaped rib is arranged in a bottom portion of the lens unit,
the frame-shaped rib surrounds the imaging device, and
the lens unit is bonded to the substrate in a bottom portion of the frame-shaped rib;
an adhesive that has a photo-curable property, wherein the adhesive bonds the lens unit to the substrate; and
a shield cover that covers the drive circuit, wherein
a corner portion of the shield cover that is adjacent to a corner portion of the bottom portion of the lens unit includes a light path,
the light path is used when the corner portion of the lens unit adjacent to the corner portion of the shield cover is irradiated with light to cure the adhesive.

2. The image-capturing apparatus according to claim 1, wherein
the shield cover has a lid shape that includes a rectangular top plate and a side plate adjacent to an end of the top plate.

3. The image-capturing apparatus according to claim 2, wherein
the shield cover includes, as the light path, a notch in the corner portion of the shield cover that is adjacent to the corner portion of the bottom portion of the lens unit.

4. The image-capturing apparatus according to claim 3, wherein
the notch is in the side plate in the corner portion of the shield cover.

5. The image-capturing apparatus according to claim 4, wherein
the notch is further in the top plate in the corner portion of the shield cover.

6. The image-capturing apparatus according to claim 4, wherein
the notch has a shape having a wider width toward the substrate.

7. The image-capturing apparatus according to claim 1, wherein
the lens unit is bonded to the substrate by the adhesive which is cured based on irradiation of the light onto four corners of the bottom portion of the lens unit.

8. The image-capturing apparatus according to claim 1, further comprising
a holding frame that has a frame shape surrounding the imaging device, wherein
the holding frame is on the substrate to hold the lens unit, and
the adhesive bonds the lens unit to the substrate by bonding the holding frame and the lens unit.

9. The image-capturing apparatus according to claim 8, wherein
the holding frame includes an optical filter, and
the optical filter is configured to transmit light of a specified wavelength from among light entering the imaging device.

10. The image-capturing apparatus according to claim 1, further comprising
a closing portion that closes the light path of the shield cover after the adhesive is cured.

11. The image-capturing apparatus according to claim 1, wherein
the adhesive bonds the lens unit to the substrate after an adjustment of an optical axis of the lens unit with respect to the imaging device.

12. A method for producing an image-capturing apparatus, the method comprising:
arranging a drive circuit on a substrate such that the drive circuit is adjacent to an imaging device on the substrate;
arranging a shield cover to cover the drive circuit, wherein a corner portion of the shield cover includes a light path;
arranging the imaging device on the substrate;
arranging a lens unit on the substrate on which the imaging device is arranged, wherein
the lens unit includes a lens and a frame-shaped rib,
the lens is configured to form an image of a subject into the imaging device,
the frame-shaped rib is arranged in a bottom portion of the lens unit,
the frame-shaped rib surrounds the imaging device, and
the lens unit is arranged on the substrate in a bottom portion of the frame-shaped rib; and
bonding the lens unit to the substrate by irradiating light onto an adhesive and by curing the adhesive, wherein
the adhesive has a photo-curable property and bonds the lens unit to the substrate, and
the light is irradiated through the light path in the corner portion of the shield cover that is adjacent to a corner portion of the bottom portion of the lens unit.

13. The method for producing an image-capturing apparatus according to claim 12, further comprising bonding the lens unit to the substrate by irradiating light onto four corners of the bottom portion of the lens unit.

14. The method for producing an image-capturing apparatus according to claim 12, further comprising:
adjusting an optical axis of the lens unit with respect to the imaging device;
performing a provisional bonding of a portion of the bottom portion of the lens unit subsequent to the adjustment of the optical axis of the lens unit; and
performing a complete bonding of an entire periphery of the bottom portion of the frame-shaped rib to bond the lens unit to the substrate.

* * * * *